United States Patent
Alidedeoglu et al.

(10) Patent No.: US 10,364,321 B2
(45) Date of Patent: Jul. 30, 2019

(54) BATCH PROCESS FOR MAKING POLYBUTYLENE TEREPHTHALATE

(71) Applicant: SABIC GLOBAL TECHNOLOGIES B.V., Bergen op Zoom (NL)

(72) Inventors: Husnu Alp Alidedeoglu, Evansville, IN (US); Prashant Kumar, Evansville, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/320,888

(22) PCT Filed: Aug. 13, 2015

(86) PCT No.: PCT/US2015/045004
§ 371 (c)(1),
(2) Date: Dec. 21, 2016

(87) PCT Pub. No.: WO2016/025684
PCT Pub. Date: Feb. 18, 2016

(65) Prior Publication Data
US 2017/0198090 A1 Jul. 13, 2017

Related U.S. Application Data

(60) Provisional application No. 62/037,876, filed on Aug. 15, 2014, provisional application No. 62/181,511, filed on Jun. 18, 2015.

(51) Int. Cl.
*C08G 63/85* (2006.01)
*C08G 63/183* (2006.01)

(52) U.S. Cl.
CPC .......... *C08G 63/85* (2013.01); *C08G 63/183* (2013.01)

(58) Field of Classification Search
CPC .... C08G 63/78; C08G 18/4216; C08G 18/73; C08G 63/183; C08G 63/916; C08G 18/4225; C08K 5/05; C08K 5/10; C08K 5/101; C08L 3/00; C08L 69/00; C08L 77/12; C08L 2205/02; C08L 67/00; C08L 67/02; C08L 67/04
See application file for complete search history.

(56) References Cited

U.S. PATENT DOCUMENTS

| | | | |
|---|---|---|---|
| 4,289,895 A * | 9/1981 | Burkhardt | B01J 19/1862 560/92 |
| 4,346,213 A | 8/1982 | Hall et al. | |
| 4,656,241 A * | 4/1987 | Iida | C08G 63/85 528/279 |
| 5,064,935 A * | 11/1991 | Jackson | C08G 63/78 528/272 |
| 5,663,281 A * | 9/1997 | Brugel | C08G 63/80 528/176 |
| 5,786,443 A * | 7/1998 | Lowe | C07C 67/08 526/67 |
| 5,811,496 A * | 9/1998 | Iwasyk | B01J 3/042 525/437 |
| 6,706,396 B1 * | 3/2004 | Hayes | B29B 9/06 428/402 |
| 7,204,962 B2 * | 4/2007 | Nakamoto | C08G 63/78 422/134 |
| 2002/0028904 A1 | 3/2002 | Dhawan et al. | |

FOREIGN PATENT DOCUMENTS

| | | |
|---|---|---|
| CN | 1472234 | 2/2004 |
| CN | 1612907 A | 5/2005 |
| CN | 101253217 A | 8/2008 |
| CN | 103304788 A | 9/2013 |
| JP | 2000344874 A | 12/2000 |
| JP | 2005194519 | 7/2005 |
| KR | 20140028960 | 10/2014 |

OTHER PUBLICATIONS

R.R.Gallucci et al "Poly(Butylene Terephthalate)", Modern Polyesters, Chapter 8, pp. 293-321, 2003.*
International Search Report for International Application No. PCT/US2015/045004; International Filing Date: Aug. 13, 2015; dated Nov. 2, 2016; 4 pages.
Written Opinion of the International Searching Authority for International Application No. PCT/US2015/045004; International Filing Date: Aug. 13, 2015; dated Nov. 2, 2015; 6 pages.

* cited by examiner

*Primary Examiner* — Ling Siu Choi
*Assistant Examiner* — Gennadiy Mesh
(74) *Attorney, Agent, or Firm* — Cantor Colburn LLP (57) ABSTRACT

A batch process for preparing polybutylene terephthalate (PBT) includes heating a solid PBT oligomer having an intrinsic viscosity (IV) of 0.1 to 0.2 dL/g and a carboxylic acid end group concentration [CEG] of 90 to 180 mmol/kg at a temperature and pressure defined herein to form melted homogeneous PBT oligomer containing 0 to 300 ppm tetra ($C_1$-$C_8$ alkyl) titanate catalyst, and polycondensing the melted homogeneous PBT oligomer in the presence of a tetra($C_1$-$C_8$ alkyl) titanate catalyst, reducing the pressure, and maintaining the temperature at approximately 245-260° C. for a sufficient time to provide PBT having an IV of 0.55 and 1.20 dL/g. The PBT oligomer can be prepared by heating a mixture of 1,4-butane diol and purified terephthalic acid in the presence of a tetra($C_1$-$C_8$ alkyl) titanate catalyst.

8 Claims, 4 Drawing Sheets

BATCH PROCESS FOR MAKING POLYBUTYLENE TEREPHTHALATE

CROSS REFERENCE TO RELATED APPLICATIONS

This application is a National Stage application of PCT/US2015/045004, filed Aug. 13, 2015, which claims the benefit of U.S. Provisional Application No. 62/037,876, filed Aug. 15, 2014 and U.S. Provisional Application No. 62/181,511, filed Jun. 18, 2015, both of which are incorporated by reference in their entirety herein.

FIELD OF THE INVENTION

Disclosed are improved processes for making polybutylene terephthalate (PBT) resin. The resin is prepared from oligomers of purified terephthalic acid (PTA) and 1,4-butane diol (BDO) in the presence of a catalyst.

BACKGROUND OF THE INVENTION

PBT resins are semicrystalline thermoplastics used in a variety of durable goods. PBT resins are now widely used for components in the electronics and automotive industries. As these market sectors continue to expand and evolve, demand for PBT has continued to grow. Thus, in 2009, worldwide consumption of PBT was reported to total 750 kilotons. Demand for PBT is projected to increase at least 5 percent per year, leading to a projected demand of 1300 kilotons by the year 2020.

PBT producers continue to face the challenge of meeting increasing demand for PBT while dealing with higher production costs. One approach to improving process yield and reducing cost on an industrial scale relates to using PBT oligomer to make PBT resins. PBT oligomer can be prepared from PTA and BDO. To be useful in making PBT resin for specific end purposes, it is necessary to strictly control the carboxylic acid end group concentration [CEG] and IV values of the PBT oligomer. PBT oligomers consisting of high carboxylic acid end group concentration (greater than 100 mmol/kg) are valuable for thermoset and composite applications due to the high carboxylic acid functionality. These oligomers are also important intermediates for making PBT via either a continuous or batch processes. Undesirable side reactions such as backbiting and thermal degradation limit the quality of the PBT oligomers for further processing. When thermal degradation and backbiting occur, the molecular weight increase of PBT is reduced.

As a result, there remains a need for new and improved processes for making PBT resins from PBT oligomer with desired IV and [CEG] values and minimized rates of degradation side reactions.

SUMMARY OF THE INVENTION

These and other needs are met by the present invention which is directed to a processes for making PBT resin, comprising polycondensation of PBT oligomer; wherein the polycondensation process is carried out either in a batch process or continuously.

In one aspect, the process is a batch process. The batch process for preparing PBT comprises:

heating at approximately 245-260° C. and 1 atmosphere of pressure PBT oligomer having an intrinsic viscosity (IV) of 0.1 to 0.2 dL/g and a high carboxylic acid end group concentration [CEG] of 90 to 180 mmol/kg until the PBT melts and becomes homogeneous to form melted homogeneous PBT oligomer; wherein the PBT oligomer contains 0 to 300 ppm tetra($C_1$-$C_8$ alkyl) titanate catalyst;

polycondensing the melted homogeneous PBT oligomer by adding 0.1 to 250 ppm tetra($C_1$-$C_8$ alkyl) titanate catalyst, reducing the pressure to approximately 0.1 to 4 mm Hg, and maintaining the temperature at approximately 245-260° C. for a sufficient time to provide PBT having an IV of between 0.55 and 1.20 dL/g.

The Applicants have surprisingly and unexpectedly found that a complex combination of variables ranging from trans-esterification temperature, trans-esterification pressure, residence time, reactor level, finisher volume surface ratio, catalyst concentration, and additional BDO amount determines the IV and [CEG] of the PBT resin prepared by the process.

The advantages of the new processes include reduced energy consumption needed to produce the PBT as well as the generation of PBT resins with lower variable cost of manufacturing. In addition, using PTA instead of dimethyl terephthalate (DMT) to make PBT has been shown to give rise to highly pure tetrahydrofuran (THF), a by-product of the PBT synthesis process with commercial and strategic downstream value.

DETAILED DESCRIPTION OF THE INVENTION

If a term in the present application contradicts or conflicts with a term in a reference, the term in the present application takes precedence over the conflicting term from the reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein all percent by weights are based on the total weight of the composition.

In the processes disclosed herein, PBT resin is prepared from PBT oligomer. PBT oligomer is typically prepared by reacting terephthalic acid and BDO in the presence of a catalyst. Various grades of terephthalic acid may be used, but PTA is preferred. Purified PTA is commercially available from a number of vendors and typically contains 10 percent or less of impurities as measured using conventional techniques.

Typically, BDO and PTA are combined in a molar ratio of 6:1 to 2:1 in the presence of a catalyst. More particularly, BDO and TA are combined in a molar ratio of 4.25:1 to 2.95:1 in the presence of TPT. As an example, to achieve an IV of approximately 0.13-0.17 dl/g and a [CEG] of between 90 and 180 mmol/kg, a BDO to PTA ratio of 3:1 is employed. Alternatively, to achieve an IV of 0.25-0.43 dl/g and a [CEG] of lower than 20 mmol/kg, a BDO to PTA ratio of 4:1 is employed. The molar ratio of BDO to PTA will vary depending on the desired IV and [CEG] of the resulting PBT oligomer.

Many catalysts have been identified and can be used in the process, but a particularly preferred catalyst is a tetra($C_1$-$C_8$ alkyl) titanate catalyst such as tetraisopropyl titanate (TPT).

To make PBT oligomer, BDO, PTA, and TPT are combined and heated to a temperature of approximately 160° C. to 180° C. When the temperature of the reaction mixture is in the range of approximately 160° C. to 180° C., the temperature is gradually raised to approximately 220° C. to 265° C. Ester interchange occurs at approximately 230° C. to 260° C., and is complete when the clearing point is reached based on visual inspection. As used herein, the "clearing point" occurs when the reaction medium becomes homogeneous melt. After the clearing point is reached, the pressure is optionally adjusted reduced to about 50 to 760 mm Hg and the temperature is maintained at about approximately 230° C. to 260° C. for sufficient time to achieve the desired IV and [CEG] values in the resulting PBT oligomer. At the completion of the reaction, the pressure is returned to atmospheric pressure and the polymer is analyzed. The resulting PBT oligomer can be cooled to a solid, then flaked, powdered, or pelletized, and used to make PBT resin.

Lab Process and Batch Process

PBT resin can be prepared from PBT oligomer on a lab scale. The PBT oligomer is introduced into a three-neck round bottom flask and the flask is placed in an oil bath with the temperature adjusted to approximately 230° C. to 260° C., to melt the PBT oligomer. The PBT oligomer is typically melted at that temperature in 10 minutes while stirring at 260 rpm under nitrogen. At this stage, additional BDO and/or TPT may optionally be added. After achieving a complete melt, the polymerization stage is conducted at the same temperature with the vacuum adjusted to less than 1 mm Hg for approximately 30 minutes. The reaction is stopped, the pressure is increased to atmospheric pressure, and the polymer sample is obtained for IV and [CEG] analysis.

Figure 1:
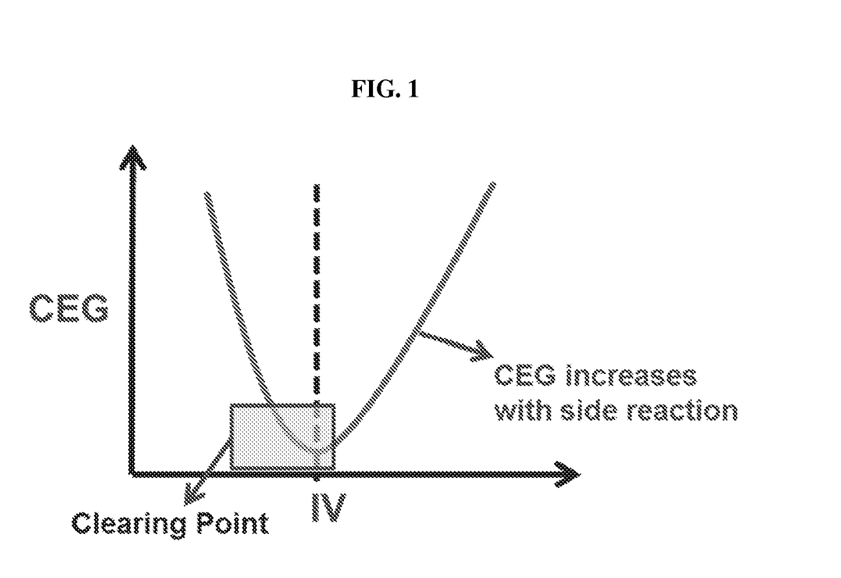
FIG. 1 depicts the kinetics of the polymerization process for making PBT from PTA and BDO.
Figure 2:
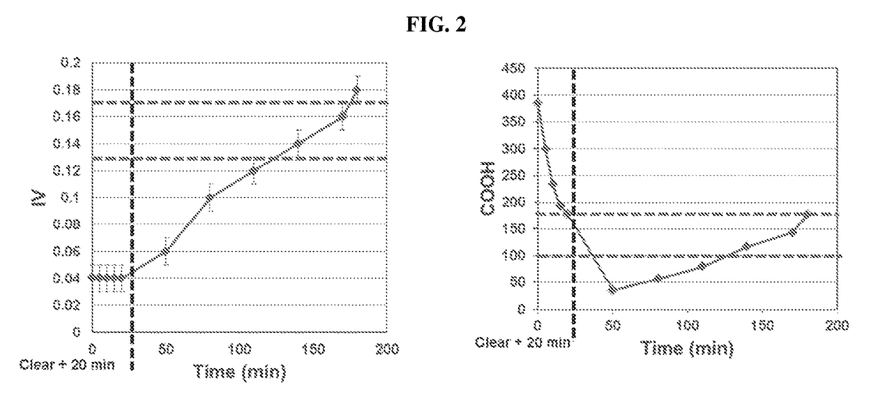
FIG. 2 depicts IV and [CEG] trends for PBT oligomer made using a 3.5:1 molar ratio BDO:PTA.

PBT resin can be prepared in a batch process on a pilot plant scale. The batch process for preparing PBT comprises heating at approximately 245-260° C. and 1 atmosphere of pressure PBT oligomer having an IV of 0.1 to 0.2 dL/g and a [CEG] of 90 to 180 mmol/kg until the PBT melts and becomes homogeneous to form melted homogeneous PBT oligomer; wherein the PBT oligomer contains 0 to 300 ppm tetra($C_1$-$C_8$ alkyl) titanate catalyst. The melted PBT oligomer is then polycondensed by reducing the pressure to approximately 0.1 to 4 mm Hg. while maintaining the temperature at approximately 245-260° C. for a sufficient time to provide PBT having an IV of between 0.55 and 1.20 dL/g. FIG. 1 depicts the kinetics of the batch polymerization process. FIG. 2 depicts IV and [CEG] trends for the batch polymerization process.

We have found that by using these process parameters, PBT having an IV of between 0.55 and 1.20 dL/g can be reliably produced from PBT oligomer that is prepared from BDO and PTA in the presence of a tetralkyl titanate catalyst with reduced side reactions such as thermal degradation and backbiting, which limit molecular weight increase. In particular, we found that polycondensation can be increased by adding additional titanium catalyst. We also surprisingly discovered that the increased concentration of free BDO or the addition of extra BDO decreased rather than increased the rate of polymerization. Thus, extra BDO is not needed in the process. We also determined that the careful control of temperature plays an important role in minimizing degradation side reactions while achieving high molecular weight PBT.

PBT Oligomer Preparation

The PBT oligomer starting material can be batch prepared by heating a 2.5:1 to 3.5:1 molar ratio mixture of BDO and PTA in the presence of 0.1 to 300 ppm tetra($C_1$-$C_8$ alkyl) titanate catalyst to 230 to 280° C. at atmospheric pressure for a sufficient time to achieve an IV of 0.1 to 0.2 dL/g and a [CEG] of 90 to 180 mmol/kg. "At atmospheric pressure" typically means that the pressure is neither increased or reduced during the reaction.

In one embodiment, the tetra($C_1$-$C_8$ alkyl) titanate catalyst used to prepare the PBT oligomer is tetra isopropyl titanate (TPT).

In another embodiment, the molar ratio of BDO to PTA to prepare the PBT oligomer is 2.75:1 to 3.25:1 and 30 to 150 ppm tetraisopropyl titanate catalyst is present.

In another embodiment, the molar ratio of BDO to PTA to prepare the PBT oligomer is a 2.9:1 to 3.1:1.

In another embodiment, the temperature to prepare the PBT oligomer is 230 to 270° C.

In another embodiment, the temperature to prepare the PBT oligomer is 230 to 265° C.

In another embodiment, the temperature to prepare the PBT oligomer is 240 to 270° C.

In another embodiment, the PBT oligomer has an IV of 0.13 to 0.18 dL/g and a [CEG] of 90 to 150 mmol/kg.

The PBT oligomer is then flaked, ground to fine particles particulate, or chunked. prior to use.

It is to be understood that the catalyst is not removed from the resulting PBT oligomer; that is, the catalyst remains in the resulting PBT oligomer.

Figure 3:
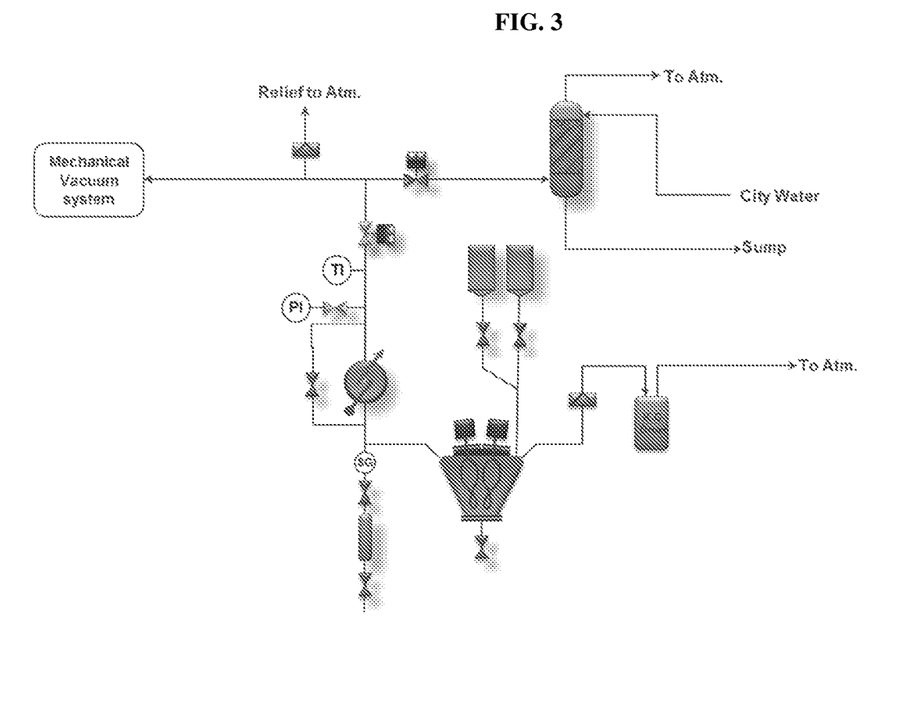
FIG. 3 provides a schematic representation of Pilot Plant I.

In one example on a pilot plant scale, a reactor such as a helicone reactor having sufficient capacity equipped is used, as depicted in FIG. 3. As depicted in FIG. 3, a 10 CV (Cone Vertical) Helicone reactor which has a capacity of 15 gallons and is equipped with a special design of twin opposing helical blades with 270 degree twist; constructed of 316 SS (Stainless Steel) with a 16 g polish finish is used in this study. The blade speed could be varied from 1 to 65 rpm (revolutions per minute). The agitators are connected to a constant torque inverter duty motor, which operates at 230/460 VAC, and 60 Hz. Bowl is double intersecting cone-type designed for 150 psig positive pressure or vacuum to 0.2 mm Hg at a temperature of 450° F. The Vessel is equipped with baffled jacketing to permit uniform circulation of heating and cooling medium at a pressure of 100 psig. The interior of the mix chamber is constructed of 316 SS with 16 g polish finish throughout and built in accordance with ASME code. These agitators provide excellent surface area for the polymer melt to build molecular weight. The Helicone reactor is also designed with an overhead condenser to condense the (BDO/THF/$H_2$O/MeOH) vapors in the esterification, trans-esterification (if any), and polymerization stages. The overheads from the reactor pass through a condenser with Pressure Indicator (PI) and Temperature Indicator (TI).

In the process, 6.8 kg (41.0 mol) of PTA, 11.1 kg (123.0 mol) of BDO, and 9.0 ml of TPT are combined in the reactor at 170° C. under a nitrogen atmosphere. The agitator speed is set at 67% of maximum. The temperature is raised to 240° C. The ester interchange (EI) reaction is run until the clearing point is observed (visual point where the homogeneous melt was achieved). The entire EI stage is carried out under complete reflux mode; that is, during the EI stage, the condensed overhead from the reactor was allowed to reflux back to the reactor. The reaction temperature is then increased to 260° C. and the reaction is run under atmospheric pressure. Approximately 90 minutes after the clearing point was reached, an IV of 0.16 dL/g and a [CEG] of 98 mmol/kg was achieved. The oligomer melt containing TPT is dropped on an aluminum pan and grinded into fine particles.

Figure 4:
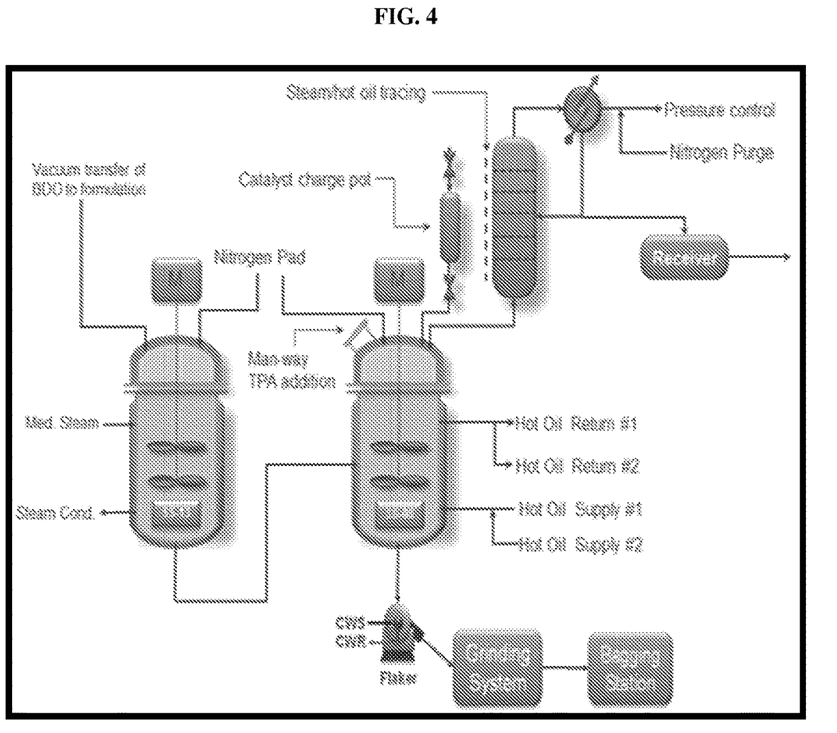
FIG. 4 provides a schematic representation of Pilot Plant II.

In another example on a pilot plant scale, a reactor such as depicted in FIG. 4 is employed to make PBT oligomer. Preheated BDO is transferred to a 200 gallon oligomerization reactor under vacuum at 100° C. During this stage, a hot oil unit is activated to increase and control the temperature of the oligomerization reactor. The hot oil unit inlet oil temperature is set between 265 and 300° C. The desired PTA load is introduced into the oligomerization reactor. After the PTA addition, the man-way addition is sealed and the oligomerization reactor temperature is allowed to increase. The oligomerization reactor stirrer is set at 40 Hertz. When the oligomerization reactor melt temperature reaches 170° C., TPT catalyst mixed with BDO is charged into the reactor. The overhead column setting is set to "Total Take-Off" to allow the overheads from the reactor to condense and collect in a receiver pot. When the oligomerization reactor melt temperature reaches the desired temperature (usually 248-250° C.), the hot oil unit hot oil set-point is decreased to prevent the melt temperature to increase beyond 252° C. At the desired IV and [CEG], the hot oil unit inlet oil set-point is decreased to 225 to 230° C. When the oligomerization reactor melt temperature reaches 225 to 230° C., the agitation is stopped and the inlet hot oil temperature is increased to 240° C. to prepare for dropping the material from the reactor and terminating the batch. A belt flaker with cooling river water spraying at the bottom of the belt is switched on. A pressure of 5 psi is applied to the reactor to drop the material from the reactor to the belt flaker. The flaked oligomer from the flaker is transferred to 1000 pound super-sacs for storage and cooling. Once the oligomers cool, a FitzMill grinder is used to grind the flaked chunks into fine powder. The oligomers have an IV of 0.17 dl/g and a [CEG] of 140 mmol/kg.

Melt Polycondensation of PBT Oligomer

As provided previously, the PBT oligomer containing catalyst that is used in the batch process is heated at approximately 245-260° C. and one atmosphere of pressure until the PBT melts and becomes homogeneous.

The resulting melted homogeneous PBT oligomer containing catalyst then undergoes polycondensation. BDO and tetra($C_1$-$C_8$ alkyl) titanate catalyst, typically TPT catalyst, optionally may be added during the polycondensation process. For example, the polycondensation may further comprise adding BDO or TPT or both BDO and TPT to the melted homogeneous PBT oligomer.

In one embodiment, 0.1 to 10 weight percent of BDO is added to the melted homogeneous PBT oligomer.

In another embodiment, 0.1 to 250 ppm tetra($C_1$-$C_8$ alkyl) titanate catalyst is added to the melted homogeneous PBT oligomer.

In another embodiment, both 0.1 to 10 weight percent BDO and 0.1 to 300 ppm tetra($C_1$-$C_8$ alkyl) titanate catalyst are added to the melted homogeneous PBT oligomer.

In the process, the pressure and temperature are adjusted. The pressure is lowered to 0.1 to 4 mm Hg. In one embodiment, the pressure is 0.1 to 3.5 mm Hg. In another embodiment, the pressure is 0.1 to 1.5 mm Hg. More preferably, the pressure is lowered to 0.1 to 1 mm Hg. The temperature is adjusted to 245 to 260° C.

The temperature and pressure are maintained for sufficient time to provide a PBT having an IV of between 0.55 to 1.2 dL/g. The amount of time may vary depending on the type of reactor employed.

BATCH PROCESS EMBODIMENTS

Embodiment B1

A batch process for preparing polybutylene terephthalate (PBT), comprising:

heating at approximately 245-260° C. and 1 atmosphere of pressure PBT oligomer having an intrinsic viscosity (IV) of 0.1 to 0.2 dL/g and a carboxylic acid end group concentration [CEG] of 90 to 180 mmol/kg until the PBT melts and becomes homogeneous to form melted homogeneous PBT oligomer; wherein the PBT oligomer contains 0 to 300 ppm tetra($C_1$-$C_8$ alkyl) titanate catalyst;

polycondensing the melted homogeneous PBT oligomer by adding 0.1 to 250 ppm tetra($C_1$-$C_8$ alkyl) titanate catalyst, reducing the pressure to approximately 0.1 to 4 mm Hg, and maintaining the temperature at approximately 245-260° C. for a sufficient time to provide PBT having an IV of between 0.55 and 1.20 dL/g.

Embodiment B2

The batch process of embodiment B1, wherein the PBT oligomer is flaked, particulate, or chunked.

Embodiment B3

The batch process of embodiments B1-2, further comprising adding to the melted homogeneous PBT oligomer 0.1 to 10 weight percent of BDO, 0.1 to 300 ppm tetra($C_1$-$C_8$ alkyl) titanate catalyst, or both 0.1 to 10 weight percent BDO and 0.1 to 300 ppm tetra($C_1$-$C_8$ alkyl) titanate catalyst.

Embodiment B4

The batch process of embodiment B3, wherein 0.1 to 10 weight percent BDO is added to the melted homogeneous PBT oligomer.

Embodiment B5

The batch process of embodiment B3, wherein 0.1 to 300 ppm tetra($C_1$-$C_8$ alkyl) titanate catalyst is added to the melted homogeneous PBT oligomer.

Embodiment B6

The batch process of embodiment B3, wherein 0.1 to 10 weight percent BDO and 0.1 to 300 ppm tetra($C_1$-$C_8$ alkyl) titanate catalyst to the melted homogeneous PBT oligomer.

Embodiment B7

The batch process of embodiment B3, wherein 0.1 to 10 weight percent BDO is added to the melted homogeneous PBT oligomer; wherein 0.1 to 300 ppm tetra($C_1$-$C_8$ alkyl)

titanate catalyst is added to the melted homogeneous PBT oligomer; and wherein the tetra($C_1$-$C_8$ alkyl) titanate catalyst is tetraisopropyl titanate (TPT).

Embodiment B8

The batch process of embodiments B1-7, further comprising preparing the PBT oligomer by heating a 2.5:1 to 3.5:1 molar ratio mixture of BDO and terephthalic acid (PTA) in the presence of 0.1 to 300 ppm tetra($C_1$-$C_8$ alkyl) titanate catalyst to 230 to 280° C. at atmospheric pressure for a sufficient time to achieve an IV of 0.1 to 0.2 dL/g and a [CEG] of 90 to 180 mmol/kg.

Embodiment B9

The batch process of embodiment B8, wherein the tetra ($C_1$-$C_8$ alkyl) titanate catalyst used to prepare the PBT oligomer is tetraisopropyl titanate (TPT).

Embodiment B10

The batch process of embodiment B9, wherein the molar ratio of BDO to PTA to prepare the PBT oligomer is 2.75:1 to 3.25:1 and 30 to 150 ppm TPT catalyst is present.

Embodiment B11

The batch process of embodiment B10, wherein the molar ratio of BDO to PTA to prepare the PBT oligomer is a 2.9:1 to 3.1:1.

Embodiment B12

The batch process of embodiments B9-11 wherein the temperature to prepare the PBT oligomer is 240 to 270° C.

Embodiment B13

The batch process of embodiments B9-12, wherein the PBT oligomer has an IV of 0.13 to 0.18 dL/g and a [CEG] of 90 to 150 mmol/kg.

Embodiment B14

A batch process for preparing PBT, comprising:
preparing the PBT oligomer by heating a 2.5:1 to 3.5:1 molar ratio mixture of BDO and PTA in the presence of 0.1 to 300 ppm tetra($C_1$-$C_8$ alkyl) titanate catalyst to 230 to 280° C. at atmospheric pressure for a sufficient time to achieve an IV of 0.1 to 0.2 dL/g and a [CEG] of 90 to 180 mmol/kg;
heating the PBT oligomer having an IV of 0.1 to 0.2 dL/g and a [CEG] of 90 to 180 mmol/kg at approximately 245-260° C. and 1 atmosphere of pressure until the PBT melts and becomes homogeneous to form melted homogeneous PBT oligomer;
polycondensing the melted homogeneous PBT oligomer by reducing the pressure to approximately 0.1 to 4 mm Hg while maintaining the temperature at approximately 245-260° C. for a sufficient time to provide a PBT having an IV of between 0.55 and 1.20 dL/g.

Embodiment B15

The batch process of embodiment B14, wherein the tetra($C_1$-$C_8$ alkyl) titanate catalyst used to prepare the PBT oligomer is tetra isopropyl titanate.

Embodiment B16

The batch process of embodiments B14-15, wherein the molar ratio of BDO to PTA to prepare the PBT oligomer is 2.75:1 to 3.25 and 30 to 150 ppm tetraisopropyl titanate catalyst is present.

Embodiment B17

The batch process of embodiment 16, wherein the molar ratio of BDO to PTA to prepare the PBT oligomer is 2.9:1 to 3.1:1.

Embodiment B18

The batch process of embodiments B14-17, wherein the temperature to prepare the PBT oligomer is 240 to 270° C.

Embodiment B19

The batch process of embodiments B14-18, wherein the PBT oligomer has an IV of 0.13 to 0.18 dL/g and a [CEG] of 90 to 150 mmol/kg.

Embodiment B20

The batch process of embodiments B14-19, further comprising adding 0.1 to 10 weight percent BDO, 30 to 150 ppm tetra($C_1$-$C_8$ alkyl) titanate catalyst, or both 0.1 to 10 weight percent BDO and 30 to 150 ppm tetra($C_1$-$C_8$ alkyl) titanate catalyst to the melted homogeneous PBT oligomer.

Embodiment B21

The batch process of embodiment B20, wherein 0.1 to 10 weight percent BDO is added to the melted homogeneous PBT oligomer.

Embodiment B22

The batch process of embodiment B20, wherein 30 to 150 ppm tetra($C_1$-$C_8$ alkyl) titanate catalyst is added to the melted homogeneous PBT oligomer.

Embodiment B23

The batch process of embodiment B20, wherein both 0.1 to 10 weight percent BDO and 30 to 150 ppm tetra($C_1$-$C_8$ alkyl) titanate catalyst are added to the melted homogeneous PBT oligomer.

Embodiment B24

The batch process of any one of embodiments B20, B22, and B24, wherein the tetra($C_1$-$C_8$ alkyl) titanate catalyst is TPT.

Embodiment B25

The batch process of embodiments B1-24 prepared in a pilot plant as depicted in FIG. 3.

Embodiment B26

The batch process of embodiments B1-24 prepared in a pilot plant as depicted in FIG. 4.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

Example 1: IV and [CEG] Optimization in PBT Oligomer Preparation Materials

BDO Purity: 99.5% by weight, was purchased from BASF. Tetraisopropyl titanate (TPT) catalyst, Commercial Tyzor grade was obtained from Dorse Ketal. Dimethyl terephthalate (DMT), was purchased from INVISTA. PTA was purchased from Eastman.

Equipment

A 10 CV (Cone Vertical) Helicone reactor with a capacity of 15 gallons was used. The Helicone reactor was equipped with twin opposing helical blades with a 270 degree twist. The blades were constructed of 316 SS (Stainless Steel) with a 16 g polish finish and the blade speed could be varied from 1 to 65 rpm (revolutions per minute). The agitators were connected to a constant torque inverter duty motor, which operated at 230/460 VAC, and 60 Hz. The bowl had a double intersecting cone-type design rated for 150 psig positive pressure or vacuum to 0.2 mm Hg at a temperature of 450° F. The vessel was equipped with baffled jacketing to permit uniform circulation of heating and cooling medium at a pressure of 100 psig. The interior of the mix chamber was constructed of 316 SS with 16 g polish finish throughout and built in accordance with ASME code. The agitators provide excellent surface area for the polymer melt to build molecular weight.

The Helicone reactor was also equipped with an overhead condenser to condense the (BDO/THF/$H_2O$/MeOH) vapors in the esterification, trans-esterification (if any), and polymerization stages. A Federov valve was used to sample polymer melt and oligomers from the reaction medium during atmospheric pressure and under reduced reactor pressure.

Method

PBT oligomer (Table 1.1, Entries 1-1 to 1-11) was prepared in the Helicone reactor with a BDO to PTA mole ratio equal to 3.5:1. The reactor was charged with 6.8 kg (approximately 41.0 mole) of PTA, 13.62 kg (approximately 151 mole) of BDO, and 6.0 ml of TPT at 170° C. under a nitrogen atmosphere. The agitator speed was set at 67% of maximum. The temperature was raised to 240° C. with a ramp rate of 2° C. per minute. The ester interchange (EI) reaction was run at 240° C. until the clearing point was visually observed. During the EI stage, the condensed overhead from the reactor was allowed to reflux back into the reactor. After the clearing point was reached (as observed visually), the temperature was maintained at 240° C. for 20 minutes. Five samples were obtained at this condition. The temperature was then increased to 260° C. and held constant for 180 minutes. Five samples at different intervals (approximately 30 minutes) were obtained using a Federov valve. Finally, the reaction was stopped and the final polymer sample was obtained for analysis (IV and [CEG]).

General Testing of PBT Oligomers

The IV of oligomers was measured using an automatic Viscotek Microlab® 500 series Relative Viscometer Y501. 0.5 grams of oligomer sample was fully dissolved in a 60 to 40 mixture (% volume) of phenol and 1,1,2,2-tetrachloroethane solution (Harrell Industries). Two measurements were taken for each sample, and the reported result was the average of the two measurements.

The [CEG] concentration of oligomers was measured using Metrohm-Autotitrator including Titrando 907, 800 Dosino, 2 ml and 5 ml dosing units and 814 USB sample processor. All the units are controlled from a PC using Tiamo 2.0 Full version. 1.5-2.0 grams of oligomer was fully dissolved in 50 ml of O-cresol solvent at 80° C. After dissolving, the sample was cooled to room temperature and 50 ml of O-cresol and 1 ml of water were added to the beaker. Sample blank was prepared in the similar way. The electrodes and titrant dosino were dipped into the sample solution and the titration was started. The sample titration was repeated twice and the equivalence point was noted for the calculation of [CEG] value.

DISCUSSION

The primary objective of the study was to determine process conditions required to produce PTA-based PBT oligomers with an IV between 0.13 and 0.17 dl/g, and a [CEG] concentration between 100 and 180 mmol/kg in a pilot scale batch reactor.

There are two main steps in the preparation of desired PBT oligomers in the Helicone batch reactor. The first step is the direct esterification process which is completed at the "clearing point" and indicates the point where a homogeneous melt is formed. The second step is the trans-esterification process where the IV increases with residence time in the reactor. In all runs, the esterification process conditions were kept constant. After the clearing point is visually observed, the trans-esterification process was initiated by i) increasing the reactor temperature, or ii) decreasing reactor pressure, or iii) by simultaneous combinations of i and ii. A sampling valve was used to sample during the reaction. The process variables of trans-esterification step were optimized to achieve the PTA based PBT oligomers IV and [CEG] specs. Variables for the process optimizations were: BDO to PTA mole ratio, trans-esterification reaction temperature, trans-esterification pressure after clearing point, effect of overhead reflux, effect of addition of fresh BDO during esterification step, and residence time after clearing point.

For a successful scale-up, it is desirable to establish process capability to produce the PBT oligomers made from PTA that can cover the complete specification range for both the IV and [CEG] (i.e. low, medium and high). In order to achieve the higher [CEG] (between 150 and 180 mmol/kg), the IV build-up rate in the Helicone reactor should be decreased during the same residence time. It was postulated that the BDO to PTA mole ratio may directly impact the IV build-up rate of the oligomers. This was investigated by slowing the IV build-rate at the trans-esterification temperature of 260° C. and atmospheric pressure. For this purpose, experiments were performed to evaluate the effect of BDO to PTA mole ratio equal to 3.5:1, on the IV and [CEG]. The esterification step was carried under total reflux at 240° C. In the trans-esterification step, reactor temperature was increased to 260° C.

FIG. 2 shows IV and [CEG] trends for PTA based PBT oligomers made with 3.5:1 BDO to PTA mole ratio under reflux. Dashed red lines are the desired specifications for the IV and [CEG]. Dashed black lines correspond to the clearing point plus 20 minutes, representing the point when reactor temperature was increased to 260° C. The effect of visual observation (or time of observation) of clearing point was investigated by allowing the reaction to proceed for additional 20 minutes at the reactor temperature of 240° C. in the esterification step. The rationale for introducing additional time after clearing point was to simplify the process translation from the Helicone reactor used in this example to a bigger scale reactor.

FIG. 2 shows that the IV of the PBT oligomers does not change appreciably during 20 minutes (after visual observation of the clearing point). However, the [CEG] of PBT oligomers follows an inverse trend and decreases sharply to reach a local minima. After 20 minutes and at temperature equal to 260° C., a further reduction in the [CEG] value is observed that eventually reaches a global minima point at around 30 minutes. The [CEG] then starts to increase gradually at 260° C. The IV curve indicates a gradual increase with residence time, but the rate of the reaction is slower compared to the previous examples. As a result, the residence time to obtain an IV of 0.16 dl/g is longer, thus allows enhanced backbiting reaction to increase [CEG] value of the PBT oligomers. The results for this reaction (entries 1-1 to 1-11) are provided in Table 1.1. Table 1.1 shows an IV of 0.16 dl/g and [CEG] of 143 mmol/kg at a residence time equal to 174 minutes. This corresponds to the middle specifications for the IV and [CEG].

TABLE 1.1

PBT Oligomers prepared with 3.5:1 BDO to PTA mole ratio under reflux. No additional BDO added to compensate for overheads lost during the Ester-Interchange reaction.

| Entry # | Reactor Temp (° C.) | Pressure (mm of Hg) | Time (min) | IV (dl/g) | [CEG] (mmol/kg) |
|---|---|---|---|---|---|
| 1-1 | 240 | 760 | 0 (Clear Point) | 0.04 | 384 |
| 1-2 | 240 | 760 | 6 | 0.04 | 299 |
| 1-3 | 240 | 760 | 12 | 0.04 | 233 |
| 1-4 | 240 | 760 | 17 | 0.04 | 193 |
| 1-5 | 240 | 760 | 22 | 0.04 | 177 |
| 1-6 | 260 | 760 | 53 | 0.06 | 35 |
| 1-7 | 260 | 760 | 84 | 0.10 | 56 |
| 1-8 | 260 | 760 | 113 | 0.12 | 79 |
| 1-9 | 260 | 760 | 143 | 0.14 | 117 |
| 1-10 | 260 | 760 | 174 | 0.16 | 143 |
| 1-11 | 260 | 760 | 203 | 0.18 | 177 |

Ester-Interchange Step: Temperature = 240° C., Pressure = 760 mm of Hg
Ester-Interchange Step after Clearing Point: Temperature = 240° C., Pressure = 760 mm of Hg, RT = 20 minutes
Trans-Esterification Step: Temperature = 260° C., Pressure = 760 mm of Hg, RT = 180 minutes Example 2. Batch Preparation of PBT Resin from PBT Oligomer The primary objective of this study was to determine process conditions required to produce PBT polymers having an IV greater than 0.8 dL/g from PTA based PBT oligomers having an IV of between 0.15 and 0.18 dL/g and a [CEG] of between 90 and 180 mmol/kg.

There are two main steps in the preparation of such a desired PBT polymer from PTA based PBT oligomer in a lab scale single batch process. The first step is the melting process which is carried at 250° C. until a homogeneous melt is achieved. The second step is a polycodensation process where the IV increases with residence time. In all runs, the polycondensation process conditions were kept constant (oil bath temperature: 250° C.; reactor pressure: less than 1 mm Hg). Variables for the process optimizations were: i) the addition of extra polycondensation catalyst; and/or ii) the addition of extra BDO. For each trial, the overhead composition during the direct esterification step involved the production of BDO, tetrahydrofuran (THF), and water.

Materials

BDO was obtained from BASF having a purity specification of 99.5 weight percent. TPT catalyst (commercial Tyzor grade) was obtained from Dorse Ketal. PTA was obtained from Eastman Chemical Company, Inc. PBT oligomers were prepared by SABIC Innovative Plastics (Mount Vernon, Ind. from dimethyl terephthalate (DMT) or from PTA as provided below.

Equipment

Pilot Plant I (Helicone) Design

A 10 CV helicone reactor having a capacity of 200 liters was used for the preparation of PBT oligomers from PTA. The helicone reactor was equipped with a twin opposing helical blades with 270 a degree twist. The blades were constructed from 316 stainless steel (SS) with a 16 g polish finish. The blade speed could be varied from 1 to 65 rpm. The agitators were connected to a Constant Torque Inverter Duty Motor, which operated at 230/460 VAC, and 60 Hz. These agitators provided excellent surface area for the polymer melt to build molecular weight. The helicone reactor was also designed with an overhead condenser to condense the vapors in the esterification, transesterification (if any) and polymerization stages. A general configuration of Helicone pilot plant is depicted in FIG. 3.

Lab Setup

PBT polymers were prepared from BDO and PTA in the presence of TPT catalyst on a lab scale in a 1 L 3-necked round bottom flask equipped with a condenser and a vacuum output. The reactor was immersed in an oil bath which temperature was controlled by a Camile system.

Pilot Plant II Design

The process set-up for the production of 24 metric tons of PTA based PBT oligomers at NF is included in FIG. 4. The main equipment used included:
  SS-13 Reactor: BDO Storage Tank preheated at 100° C.
  SS-8 Reactor: 2000 Gallon Oligomerization Reactor
  Hot Oil Units (HOU): 550 (Higher Temperature) and Sterlco (Lower Temperature)
  Overhead Column set at "Total Take-Off" such that the condensate was removed in the receiver pot (and not refluxed back to the reactor).
  Belt Flaker
  FitzMill Grinder
  Thermocouples: T1-T8 (Table 2.1).

TABLE 2.1

Thermocouple Details.

| Thermocouple # | Description (° C.) |
|---|---|
| T1 | Hot Oil Return |
| T2 | Hot Oil Supply |
| T3 | Reactor Melt |
| T4 | Column Bottom |

TABLE 2.1-continued

Thermocouple Details.

| Thermocouple # | Description (° C.) |
|---|---|
| T5 | Column Top |
| T6 | Condenser Inlet |
| T7 | Condenser Outlet |
| T8 | Vent |

Procedure

Preparation of PBT Oligomers (Pilot Plant I)

PBT oligomers were batch prepared in a Helicone reactor at Pilot Plant I from 6.8 kg (41.0 mol) of PTA, 11.1 kg (123.0 mol) of BDO, and 9.0 ml of TPT at 170° C. under a nitrogen atmosphere. The BDO to PTA mole ratio was equal to 3:1. The agitator speed was set at 67% of maximum. The temperature was raised to 240° C. The ester interchange (EI) reaction was run until the clearing point was observed (visual point where the homogeneous melt was achieved). The entire EI stage was carried out under complete reflux mode; that is, during the EI stage, the condensed overhead from the reactor was allowed to reflux back to the reactor. The reaction temperature was then increased to 260° C. and the reaction was run under atmospheric pressure. Approximately 90 minutes after the clearing point was reached, an IV of 0.16 dL/g and a [CEG] of 98 mmol/kg was achieved. The oligomer melt was dropped on an aluminum pan and grinded into fine particles using a coffee grinder. The ground oligomer melt was used for the lab batch polymerization process.

Preparation of PBT Oligomers (Pilot Plant II)

PBT oligomer was also prepared at Pilot Plant II. The BDO to PTA mole ratio was equal to 3:1. At the start of each batch, preheated BDO from the BDO storage tank (SS-13) was transferred to the 200 gallon oligomerization reactor (SS-8) under vacuum at 100° C. During this stage the hot oil unit (HOU 550) was activated to increase and control the temperature of the SS-8 reactor T3 thermocouple (reactor melt). The HOU 550 inlet oil temperature was set between 265 and 300° C. The desired PTA load was introduced into the SS-8 reactor by man-way addition opening. After the PTA addition, the man-way addition was sealed and the SS-8 temperature (T3) was allowed to increase. The SS-8 reactor stirrer was set at 40 Hertz. When the SS-8 reactor melt temperature (T3) reached 170° C., TPT catalyst mixed with BDO was charged into the reactor via the catalyst charge pot. The overhead column setting was set to "Total Take-Off" to allow the overheads from the reactor to condense and collect in the receiver pot. The temperature readings from each thermocouple were manually recorded in the log sheet by the operator every 30 to 45 minutes during each batch production run. When the SS-8 reactor melt temperature (T3) reached the desired temperature, usually 248-250° C., the HOU 550 hot oil set-point was decreased to prevent SS-8 melt temperature to increase beyond 252° C. Extensive sampling was performed to measure IV and [CEG]. At the desired IV and [CEG] (described below), either the HOU 550 inlet oil set-point was decreased to 225 to 230° C. or the Sterlco HOU with hot oil set-point at 220° C. was activated to reduce the SS-8 melt temperature (T3) to 225 to 230° C. When the SS-8 reactor melt temperature (T3) reached 225 to 230° C., the agitation was stopped and the inlet hot oil temperature was increased to 240° C. to prepare for dropping the material from the reactor and terminating the batch. The belt flaker with cooling river water spraying at the bottom of the belt was switched on. A pressure of 5 psi was applied to the SS-8 reactor to drop the material from the reactor to the belt flaker. The belt flaker was set at approximately 2000±250 lbs/hour to drop the entire batch in approximately 3±0.5 hours. The flaked oligomer from the flaker was transferred to 1000 pound super-sacs for storage and cooling. Once the oligomers cooled, the FitzMill grinder was used to grind the flaked chunks into fine powder. The oligomers had an IV of 0.17 dl/g and a [CEG] of 140 mmol/kg.

General Testing of PBT Resins

The IV of oligomers was measured using an automatic Viscotek Microlab® 500 series Relative Viscometer Y501. In a typical procedure, 0.5 of polymer sample was fully dissolved in a 60/40 mixture by volume of phenol/1,1,2,2-tetrachloroethane solution (Harrell Industries). Two measurements were taken for each sample, and the result reported was the average of the two measurements.

The [CEG] of oligomers was measured using Metrohm-Autotitrator including Titrando 907, 800 Dosino, 2 mL and 5 mL dosing units and a 814 USB sample processor. All the units were controlled from a PC using Tiamo 2.0 Full version. In a typical procedure, 1.5-2.0 g of oligomer was fully dissolved in 50 mL of O-cresol solvent at 80° C. After dissolving, the sample was cooled to room temperature and 50 mL of O-cresol and 1 mL of water were added to the baker. The sample blank was prepared in the similar way. The electrodes and titrant dosino were dipped into the sample solution and the titration was started. The sample titration was repeated twice and the equivalence point was noted for the calculation of [CEG] value.

Calculation: COOH(meq/KG)=consumed by sample−ml consumed by the blank)*N of NaOH*1000

Batches 2-1 to 2-4: Polycondensation from PTA Based PBT Oligomers at Pilot Plant I:

Batch 2-1 was prepared through the melt polycondensation of the PBT oligomer (Pilot Plant I, [CEG]: 98 mmol/kg, IV: 0.16 dl/g) in a glass reactor. The glass reactor was immersed in an oil bath and the temperature was adjusted to 250° C. The PTA based PBT powder was melted while stirring under nitrogen atmosphere. This process took about 10 minutes. After achieving the complete homogeneous melt, the polycondensation process was started via reducing the process pressure to below 1 mm Hg while keeping the oil temperature at 250° C. The entire polycondensation took place in 67 minutes without catalyst addition. An IV of 0.82 dl/g and a [CEG] of 9 mmol/kg were achieved.

Batch 2-2 was prepared using exactly the same conditions and setup for Batch 2-1 except TPT (50 ppm) was added and the process pressure was reduced to below 1 mm Hg while keeping the oil temperature at 250° C. An IV of 0.87 dl/g and [CEG] of 7 mmol/kg was achieved.

Batch 2-3 was prepared using exactly the same conditions and setup for Batch 2-1 except 5 g of BDO was added before the polycondensation step and the process pressure was reduced to below 1 mm Hg while keeping the oil temperature at 250° C. An IV of 0.89 dl/g and a [CEG] of 8 mmol/kg were achieved.

Batch 2-4 was prepared using exactly the same conditions and setup for Batch 2-1 except 50 ppm of titanium catalyst and 5 g of BDO were added before the polycondensation step and the process pressure was reduced to below 1 mm Hg while keeping the oil temperature at 250° C. An IV of 0.92 dl/g and a [CEG] of 6 mmol/kg were achieved.

Batches 2-5 to 2-7: Polycondensation from PTA Based PBT Oligomers at Pilot Plant II:

Batch 2-5 was prepared through the melt polycondensation of the PBT oligomer (Pilot Plant II, [CEG]: 140 mmol/kg, IV: 0.17 dl/g) in a glass reactor. The glass reactor was immersed in an oil bath adjusted to 250° C. First, the PTA based PBT powder was melted while stirring under nitrogen atmosphere. This process took about 10 minutes. After achieving the complete homogeneous melt, the polycondensation process was started via the addition of titanium catalyst and reducing the process pressure to below 1 mm Hg while keeping the oil temperature at 250° C. The entire polycondensation took place in 141 minutes without catalyst addition. An IV of 0.92 dl/g and a [CEG] of 6 mmol/kg were achieved.

Batch 2-6 was prepared exactly the same as Batch 2-5 except 0.05 mL (115 ppm based on titanium 115 ppm based on titanium) of TPT catalyst was added before the polycondensation step and the process pressure was reduced to below 1 mm Hg while keeping the oil temperature at 250° C. The residence time of the polycondensation step was 105 minutes. An IV of 1.09 dl/g and a [CEG] of 48 mmol/kg was achieved.

Batch 2-7 was prepared exactly the same as Batch 2-5 except 0.1 mL (250 ppm based on titanium) of TPT catalyst was added before the polycondensation step and the process pressure was reduced to below 1 mm Hg while keeping the oil temperature at 250° C. An IV of 1.16 dL/g and a [CEG] of 30 mmol/kg were achieved.

Results and Discussion

The results of the batch polymerizations experiments are summarized in Table 2.2.

TABLE 2.2

PBT Polymers Prepared at <1 mm Hg and 250° C. from PTA based PBT Oligomers.

| Polymer | Catalyst Added (TPT) | PBT Added | Time (min) | IV (dL/g) | [CEG] (mmol/kg) |
|---|---|---|---|---|---|
| PBT Oligomer (Pilot Plant I) | NA | NA | NA | 0.16 | 98 |
| PBT Oligomer (Pilot Plant II) | NA | NA | NA | 0.17 | 140 |
| Batch 2-1 | 0 | 0 | 67 | 0.82 | 9 |
| Batch 2-2 | 50 ppm | 0 | 30 | 0.87 | 7 |
| Batch 2-3 | 0 | 5 g | 96 | 0.89 | 8 |
| Batch 2-4 | 50 ppm | 5 g | 34 | 0.92 | 6 |
| Batch 2-5 | 0 | 0 | 141 | 0.92 | 21 |
| Batch 2-6 | 115 ppm | 0 | 105 | 1.09 | 48 |
| Batch 2-7 | 250 ppm | 0 | 34 | 1.16 | 30 |

With respect to Batch 2-1, the entire polycondensation took place in 67 minutes without catalyst addition, indicating that a considerable amount of active catalyst remained in the oligomer prepared at Pilot Plant I. A low [CEG] value of 98 mmol/kg indicates that the polycondensation occurred at the chain end and reduced [CEG] significantly. Furthermore, the reaction temperature and the residence time of the polycondensation was considerably short so that the backbiting reaction was not observed and carboxylic acid end group formation was reduced.

With respect to Batch 2-2, the effect of adding catalyst before the polycondensation step was explored. As Table 2.2 shows, the entire polycondensation took place in 30 minutes as compared to 67 minutes for Batch 2-1. Thus, the addition of TPT increased the polycondensation rate almost two times. A [CEG] value of 7 mmol/kg was observed in Batch 2-2 as compared to 9 mmol/kg in Batch 2-1, indicating that polymer chain growth occurred at end groups, lowering the [CEG] value while increasing the molecular weight of the polymer and reducing the extent of the backbiting reaction due to short residence time.

With respect to Batch 2-3, the effect of BDO addition before the polycondensation step was explored. As Table 2.2 shows, the entire polycondensation took place in 96 minutes as compared to 67 minutes in Batch 2-1 and 30 minutes in Batch 2-2. The addition of extra BDO decreased the polycondensation rate almost one and half times compared to Batch 2-1. The addition of extra BDO did not affect the process chemistry in terms of [CEG]. The [CEG] had a low value of 8, indicating a step growth mechanism through chain end.

With respect to Batch 2-4, the combined effect of catalyst and BDO addition was explored. As Table 2.2 shows, the entire polycondensation took place in 34 minutes, which was very close to the residence time of Batch 2-2. An IV of 0.92 dl/g and a [CEG] of 6 mmol/kg was achieved. The results indicate that the addition of an extra catalyst is a more powerful factor than the addition of extra BDO in affecting the rate of the polycondensation. The BDO addition did not affect the residence time in Batch 2-4, as it did in Batch 2-3. The low [CEG] value indicates that polymer chain growth occurred at end groups, lowering the [CEG] value while increasing the molecular weight of the polymer and reducing the extent of backbiting reaction due to short residence time.

With respect to Batch 2-5, the entire polycondensation took place in 141 minutes without TPT catalyst addition. An IV of 0.92 dl/g and a [CEG] of 6 mmol/kg was achieved. The results indicate that there was a less active catalyst in Pilot Plant II oligomers compare to oligomers obtained in Pilot Plant I Pilot Plant. Also, free BDO (unreacted BDO) was present in the oligomer powder, reducing the rate of the polycondensation. The exact amount of free BDO was not measured. The long residence time increased the [CEG] value due to the increased rate of the backbiting reaction in the polycondensation process.

With respect to Batch 2-6, the residence time of the polycondensation step was 105 minutes as compared to 141 minutes in Batch 2-5. The additional catalyst increased the polycondensation rate in Batch 2-6 on a small scale. However, the catalyst activity of this batch was still low compare to Batch 2-2, because free BDO slowed the polycondensation kinetics. An IV of 1.09 dl/g and a [CEG] of 48 mmol/kg was achieved. These values are within the specification limits of PBT 315. The longer residence time lead to an increased [CEG] value due to the increase of the backbiting reaction in the polycondensation process.

With respect to Batch 2-7, the residence time of the polycondensation step was only 34 minutes, which is the same as in Batch 2-2, demonstrating very fast kinetics in the polycondensation step. The fast kinetics are due to the addition of an adequate amount of catalyst to the oligomer melt, which also mitigates the effect of the free BDO. An IV of 1.16 dl/g and a [CEG] of 30 mmol/kg were achieved. The IV is within the specification limits of PBT 315. However, the [CEG] is below the specification limit. Since the residence time was very low, the extent of backbiting reaction decreased and did not generate sufficient [CEG] to achieve the specification limit of PBT 315. This batch also indicates that the high amount [CEG] in PBT oligomers does not affect the polymerization kinetics if a sufficient amount of active catalyst is provided to the melt.

Conclusion

The polymerization conditions of PTA based PBT oligomers prepared in Pilot Plant I Pilot Plant and Pilot Plant II were investigated. It was found that PTA based PBT oligomers prepared at Pilot Plant I contained more active catalyst compared to oligomers prepared in Pilot Plant II. Therefore, the polycondensation residence time for PBT made from PTA based PBT oligomers prepared at Pilot Plant I was significantly low. The IV and [CEG] values of the resulting polymers depended on trans-esterification temperature, trans-esterification pressure, and residence time. The addition of BDO before the polycondensation step increased the residence time since the polycondensation rate decreased. The presence of free BDO in the PTA based PBT oligomers prepared in Pilot Plant II also decreased the polymerization rate and increased the residence time. The introduction of the catalyst before the polycondensation step increased the IV build-up rate. The presence of adequate active catalyst in the oligomer melt was the key parameter in increasing the rate of polycondensation and reducing of the polycondensation residence time. The residence time significantly affected the IV and [CEG] of the resulting polymers. Optimization of the residence time is a critical element in achieving the target [CEG] of PBT 315. A longer residence time increased the extent of the backbiting reaction which generated more [CEG].

Comparative Examples

Lab Polymerization Process from PTA Based PBT from Pilot Plant II 75 g of PBT oligomer from Pilot Plant II was introduced into a three-neck round bottom flask. The reactor was placed in an oil bath with the temperature adjusted to 250° C. The PBT oligomer was melted in 10 minutes at that temperature while stirring at 260 rpm under nitrogen. After achieving a complete melt, the polymerization stage was conducted at the same temperature with the vacuum adjusted to less than 1 mm Hg. After achieving the desired molecular weight, the reaction was stopped, the pressure was increased to atmospheric pressure, and a polymer sample was obtained for analysis (IV and [CEG]).

Results and Discussion

There are two different side reactions that can occur in the polymerization—thermal degradation and chain backbiting. An increase in the amount or the extent of thermal degradation or chain backbiting results in either an increase in the [CEG] or the degradation of the polymer chain. The occurrence of such reactions sets the boundary conditions for melt polycondensation processes as described herein. Therefore, it is important to explore the process conditions when the polymerization stops.

In the first part of the experiment (Batch 2-8 and Batch 2-9), 150 g of PBT oligomer was cooked for 3 hours in a glass reactor which was immersed in a 270° C. oil bath. A sample was taken for [CEG] analysis every hour. Table 3 shows that [CEG] value for Batch 2-8 and Batch 2-9 increased as the cooking time increased. The average [CEG] value of 300 mmol/kg for Batch 2-8 and Batch 2-9 was achieved after 3 hours cooking at the oil temperature of 270° C. The resulting oligomers were removed from reaction medium, cooled to the room temperature and grinded to be used for the further polymerization.

The Batch 2-8 and Batch 2-9 oligomers were introduced into the same glass reactor and the oil temperature was adjusted to 250° C. After melting the oligomers, an adequate amount of active titanium catalyst (generally between 125 and 250 ppm based on titanium) was added and the reaction pressure was decreased to below 1 mbar, and the polymerization was started. Table 2.3 shows that both Batch 2-8 and Batch 2-9 oligomers resulted in high molecular weight PBT resin even though the starting [CEG] value of the PBT oligomers was very high.

TABLE 2.3

Cooking Experiments and Polymerization Results.

| Batch | COOH Init. (mmol/kg) | Cook Temp (° C.) | [CEG] 1 hr (mmol/kg) | [CEG] 2 hr (mmol/kg) | [CEG] 3 hr (mmol/kg) | End Time (min) | [CEG] (mmol/kg) | IV (dL/g) |
|---|---|---|---|---|---|---|---|---|
| 2-8 | 9 | 270 | 250 | 291 | 323 | 196 | 95 | 0.81 |
| 2-9 | 9 | 270 | 214 | 262 | 283 | 98 | 88 | 0.84 |
| 2-10 | 9 | 290 | 304 | 395 | 514 | 214 | 31 | 0.31 |
| 2-11 | 13 | | | | | 242 | 18 | 0.48 |

In the second part of the experiment, the PBT oligomer (Batch 2-10) was cooked at oil temperature of 290° C., which gave a melt temperature of 275° C. Table 2.3 shows that the [CEG] value increased even more, to 514 mmol/kg, after 3 hours of cooking. The resulting PBT oligomers were subjected to the same polymerization conditions as provided for Batch 2-8 and Batch 2-9. An IV of 0.31 dL/g was achieved after 214 minutes, indicating that the molecular weight of PBT oligomer could not be increased.

Batch 2-11 was prepared in Helicone reactor starting with the Pilot Plant II PBT oligomers. After introducing an adequate amount of catalyst (generally between 125 and 250 ppm based on titanium), the melt temperature was increased to 275° C. and the reaction pressure was decreased to 1 mm Hg. Very fast polymerization kinetics were observed, and a high molecular weight polymer was achieved within 25 minutes. After 25 minutes, the molecular weight of the polymer started dropping rapidly due to the possible degradation of the polymer. The resulting product was removed from the pilot plant and grinded to be used in the lab polymerization. The molecular weight of Batch 2-11 oligomer could not be increased after 242 minutes polymerization time even in the presence of high catalyst load.

The last experiment showed that once the polymer and/or oligomer is degraded, it is impossible to polymerize again in the presence of the active catalyst. In the case of the Batch 2-8 and Batch 2-9 experiments, although the oligomers were cooked at high temperature for 3 hours and the [CEG] value increased to a very high value, a high molecular weight product could be achieved because the oligomers and/or polymers were not fully degraded. This can be explained by examining two different degradation mechanisms such as the backbiting reaction and thermal degradation or chain scission. Scheme 1 shows the backbiting mechanism. The hydroxybutyl end groups formed by the esterification reaction of the carboxylic acid group cyclize back, making a six member ring in the presence of acid catalyst, forming tetrahydrofuran (THF) and carboxylic acid end group. This reaction occurs only at the end group of the PBT oligomers.

The oligomers are not fully degraded. Surprisingly, the carboxylic acid content increased with time in Batch 2-8 and Batch 2-9 due to the backbiting reaction, and the oligomer did not degrade. Therefore, PBT oligomers can be polymerized successfully in the presence of the active catalyst.

Scheme 2 shows the thermal degradation or chain scission mechanism. At high temperature (greater than 260° C.), thermal degradation reactions are significant. The most important pyrolysis reaction of PBT is the formation of butadiene. A six-membered transition state is formed in the PBT chain, which subsequently, by β-hydrogen transfer, leads to the formation of an unsaturated end group and a carboxylic acid end group. This degradation mechanism is very efficient in PBT synthesis and the second β-hydrogen transfer yields butadiene. This reaction actually ends up losing BDO in the polymeric chain, which further inhibits due to the lack of BDO in the reaction medium. Batch 2-10 and Batch 2-11 can be explained through this mechanism. Since the polymerization and cooking temperature were too high, the polymer and/or oligomer were degraded and the polymerization was not successful.

CONCLUSION

There are two possible degradation mechanisms that can increase the [CEG] value of PBT chains during the melt process. The first mechanism is the backbiting mechanism, which occurs only at the alcoholic end group of the PBT chain. The backbiting mechanism converts the alcoholic end group to a carboxylic acid without degrading the main chain. Therefore, even though the [CEG] value increases with a high rate, the PBT oligomer can still be polymerized in the presence of active titanium catalyst, since the polycondensation pathway is the transesterification mechanism. When the PBT oligomer is susceptible to the extensive backbiting reaction due to a high process temperature and residence time, the [CEG] value surprisingly increases to higher than 200 mmol/kg. On the other hand, these oligomers are still active for further polymerization.

The second degradation mechanism is thermal degradation and/or chain scission, which occurs in the middle of the PBT chain and causes losing BDO from the chain as a butadiene. This degradation pathway is degenerative and terminates the transesterification reaction due to lack of BDO in the reaction medium. The PBT melt is thermally degraded when the melt temperature is greater than 260° C. and the [CEG] value is higher than 350 mmol/kg in average and inhibits the polymerization process.

In conclusion, the process temperature and residence time are the main parameters to control degradation during the melt polymerization process. The extensive backbiting reaction can be controlled through lowering the process temperature and residence time. It is very crucial to control the melt temperature during the polycondensation to avoid the thermal degradation. The recommended melt temperature is between 245 and 255° C. Another important parameter is the presence of adequate active titanium catalyst. It is important to introduce an adequate active catalyst amount into the reactor for achieving the high molecular weight polymer resin.

The foregoing disclosure has been described in some detail by way of illustration and example, for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A batch process for preparing polybutylene terephthalate (PBT), comprising:

heating at approximately 245-260° C. and 1 atmosphere of pressure a solid PBT oligomer having an intrinsic viscosity (IV) of 0.1 to 0.2 dL/g and a carboxylic acid end group concentration [CEG] of greater than 100 to 180 mmol/kg until the PBT melts and becomes homogeneous to form melted homogeneous PBT oligomer; wherein the PBT oligomer contains 30 to 150 ppm tetra($C_1$-$C_8$ alkyl) titanate catalyst;

adding 30 to 150 ppm tetra($C_1$-$C_8$ alkyl) titanate catalyst; and polycondensing the melted homogeneous PBT oligomer by reducing the pressure to approximately 0.1 to 4 mm Hg, and maintaining the temperature at approximately 245-260° C. to provide PBT having an IV of between 0.55 and 1.20 dL/g.

2. The batch process of claim 1, wherein the PBT oligomer is flaked, particulate, or chunked.

3. The batch process of claim 1, further comprising adding to the melted homogeneous PBT oligomer 0.1 to 10 weight percent of 1,4 butane diol (BDO).

4. The batch process of claim 1, wherein the PBT oligomer is prepared by heating a 2.5:1 to 3.5:1 molar ratio mixture of BDO and purified terephthalic acid (PTA) in the presence of 30 to 150 ppm tetra isopropyl titanate catalyst to 230 to 280° C. at atmospheric pressure to achieve an IV of 0.1 to 0.2 dL/g and a [CEG] of greater than 100 to 180 mmol/kg.

5. The batch process of claim 4, wherein the molar ratio of BDO to PTA to prepare the PBT oligomer is 2.75:1 to 3.25:1.

6. The batch process of claim 5, wherein the molar ratio of BDO to PTA to prepare the PBT oligomer is a 2.9:1 to 3.1:1.

7. The batch process of claim 4 wherein the temperature to prepare the PBT oligomer is 240 to 270° C.

8. The batch process of claim 4, wherein the PBT oligomer has an intrinsic viscosity IV of 0.13 to 0.18 dL/g and a [CEG] of greater than 100 to 150 mmol/kg.

* * * * *